US008738178B2

(12) United States Patent
Choi et al.

(10) Patent No.: US 8,738,178 B2
(45) Date of Patent: May 27, 2014

(54) METHOD FOR CONTROLLING THE WALK OF HUMANOID ROBOT

(75) Inventors: Young Jin Choi, Seoul (KR); Do Ik Kim, Seoul (KR); Yong Hwan Oh, Seoul (KR); Chang Hwan Kim, Seoul (KR); Bum Jae You, Seoul (KR); Jung San Cho, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 1575 days.

(21) Appl. No.: 12/090,350

(22) PCT Filed: Oct. 24, 2005

(86) PCT No.: PCT/KR2005/003536
§ 371 (c)(1),
(2), (4) Date: Apr. 15, 2008

(87) PCT Pub. No.: WO2007/046568
PCT Pub. Date: Apr. 26, 2007

(65) Prior Publication Data
US 2008/0281469 A1    Nov. 13, 2008

(30) Foreign Application Priority Data
Oct. 19, 2005    (KR) .......................... 10-2005-0098713

(51) Int. Cl.
*G05B 19/18*    (2006.01)
(52) U.S. Cl.
USPC ...... 700/250; 700/245; 700/260; 318/568.12; 180/8.1

(58) Field of Classification Search
USPC ......... 700/245, 250, 260, 261, 262, 263, 253; 318/568.11, 568.12, 568.18, 568.19, 318/568.2; 901/1, 9, 23; 180/8.1
See application file for complete search history.

(56) References Cited

U.S. PATENT DOCUMENTS 4,834,200 A  *  5/1989  Kajita ............................ 180/8.1
5,151,859 A     9/1992  Yoshino et al.
(Continued)

FOREIGN PATENT DOCUMENTS

EP    1486298 A1    12/2004
JP    05-253868     10/1993
(Continued)

OTHER PUBLICATIONS

Sugihara et al. : "Realtime Humanoid Motion Generation through ZMP Manipulation based on Inverted Pendulum Control", May 2002, pp. 1404-1409.*

(Continued)

*Primary Examiner* — Muhammad Shafi
*Assistant Examiner* — Sanjeev Malhotra
(74) *Attorney, Agent, or Firm* — Fenwick & West LLP

(57) ABSTRACT

The invention relates to a method for controlling walking of humanoid bipedal walking robot. More specifically, the invention comprises steps of designing a zero momentum position (ZMP) of a robot for the ground surface (a); calculating trajectories of a center of gravity (COG) of the robot along with the trajectory of the ZMP (b); calculating an angular velocity of driving motors of two feet, which has the robot walk according to the trajectory of the ZMP (c); and controlling walking of the robot by driving the driving motors according to the angular velocity of the driving motors calculated above. The robot walking control method according to the invention has stability against disturbances.

9 Claims, 4 Drawing Sheets

(56) References Cited

U.S. PATENT DOCUMENTS

| | | | |
|---|---|---|---|
| 5,337,235 A | | 8/1994 | Takahashi et al. |
| 5,355,064 A | * | 10/1994 | Yoshino et al. .......... 318/568.12 |
| 5,404,086 A | * | 4/1995 | Takenaka et al. ........ 318/568.12 |
| 5,432,417 A | | 7/1995 | Takenaka et al. |
| 5,808,433 A | | 9/1998 | Tagami et al. |
| 5,872,893 A | | 2/1999 | Takenaka et al. |
| 5,936,367 A | | 8/1999 | Takenaka |
| 6,301,524 B1 | * | 10/2001 | Takenaka ...................... 700/245 |
| 6,943,520 B2 | * | 9/2005 | Furuta et al. ............. 318/568.12 |
| 2004/0044440 A1 | * | 3/2004 | Takenaka ...................... 700/245 |
| 2004/0051493 A1 | | 3/2004 | Furuta et al. |
| 2005/0055131 A1 | | 3/2005 | Mikami et al. |
| 2005/0240307 A1 | | 10/2005 | Kuroki et al. |
| 2005/0267630 A1 | * | 12/2005 | Kajita et al. .................. 700/245 |
| 2008/0065269 A1 | * | 3/2008 | Hasegawa ..................... 700/260 |

FOREIGN PATENT DOCUMENTS

| | | |
|---|---|---|
| JP | 2002-361574 A | 12/2002 |
| JP | 2003-058907 | 2/2003 |
| JP | 2004-114243 | 4/2004 |
| JP | 2004-114243 A | 4/2004 |
| JP | 2004-174648 | 6/2004 |

OTHER PUBLICATIONS

Choi et al. : "On the Stability of Indirect ZMP Controller for Biped Robot Systems", Sep.-Oct. 2004, pp. 1966-1971.*

Shuji, K., "Humanoid Robot," Apr. 2005, pp. 108-111 and pp. 120-139.

Choi, Y. et al., "On the Stability of Indirect ZMP Controller for Biped Robot Systems," Proceedings of the 2004 IEEE/RSJ International Conference on Intelligent Robots and Systems, Sendai, Japan, Sep. 28-Oct. 2, 2004, pp. 1966-1971.

Kajita, S. et al., "Biped Walking Pattern Generation by Using Preview Control of Zero-Moment Point," Proceedings of the 2003 IEEE, International Conference on Robotics & Automation, Taipei, Taiwan, Sep. 14-19, 2003, pp. 1620-1626.

Kajita, S. et al., "A Realtime Pattern Generator for Biped Walking," Proceedings of the 2002 IEEE, International Conference on Robotics & Automation, Washington, D.C., May 2002, pp. 31-37.

Kim, D. et al., "Motion-Embedded COG Jacobian for a Real-Time Humanoid Motion Generation," ICINCO 2005, Robotics and Automation, 2005, pp. 55-61.

Kim, D. et al., "Real-Time Generation of Humanoid Motion with the Motion-Embedded COG Jacobian," ICCAS2005, KINTEX, Gyeonggi-Do, Korea, Jun. 2-5, 2005, pp. 2148-2153.

Sugihara, T. et al., "Realtime Humanoid Motion Generation Through ZMP Manipulation Based on Inverted Pendulum Control," Proceedings of the 2002 IEEE, International Conference on Robotics & Automation, Washington, D.C., May 2002, pp. 1404-1409.

Takanishi, A. et al., "Realization of Dynamic Biped Walking Stabilized by Trunk Motion on a Sagitally Uneven Surface," IEEE International Workshop on Intelligent Robots and Systems, IROS '90, 1990, pp. 323-330.

PCT International Search Report and Written Opinion, PCT International Application No. PCT/KR2005/003536, Jul. 14, 2006.

* cited by examiner

METHOD FOR CONTROLLING THE WALK OF HUMANOID ROBOT

TECHNICAL FIELD

The invention relates to a method for controlling walking of humanoid bipedal walking robot that can walk with two feet. The robot walking control method according to the invention has stability against disturbances.

BACKGROUND ART

The following technologies about conventional bipedal walking of humanoid robot are known.

First, the method performing walking control by using ground reactive force, which is measured on sole of bipedal walking robot, is disclosed in U.S. Pat. No. 5,151,859 and U.S. Pat. No. 5,432,417.

Second, a walking control method using the movement pattern of gravitational center of bipedal walking robot is suggested in U.S. Pat. No. 5,337,235.

Third, real ground surface may have arbitrary small decline for the robot performing walking according to predetermined walking pattern. To overcome the instability of a bipedal walking robot from this, a method that a decline measurement device is attached to the bipedal walking robot for correcting walking pattern according to the ground decline measured is disclosed in U.S. Pat. No. 5,404,086.

Fourth, a method for generating a variety of walking patterns that the movement of body are taken into account is disclosed in U.S. Pat. No. 5,808,433, U.S. Pat. No. 5,872,893, and U.S. Pat. No. 5,936,367.

But, conventional robot walking control methods do not have desirable effect in the stability point of view.

DISCLOSURE OF INVENTION

Technical Problem

The invention is invented to solve problems described above, which provides a method for controlling walking of humanoid bipedal walking robot that can walk on two feet. The robot walking control method according to the invention has stability against disturbances.

Accordingly, the object of the invention is to provide a walking control method of humanoid bipedal walking robot.

Technical Solution

The invention relates to a method for controlling walking of humanoid bipedal walking robot. More specifically, the invention is related to a robot walking control method comprising steps of:

designing a zero momentum position (ZMP) of a robot for the ground surface (a);

calculating trajectories of a center of gravity (COG) of the robot from the ZMP (b);

calculating an angular velocity of driving motors of two feet, which make the robot walk according to the trajectory of the ZMP (c); and controlling walking of the robot by driving the driving motors according to the angular velocity of the driving motors calculated above.

MODE FOR THE INVENTION

Hereinafter, embodiments of the invention with reference to drawings are explained concretely. The invention, however, is not confined by the embodiments below.

1. A Simplified Model of a Bipedal Walking Robot

Figure 1:
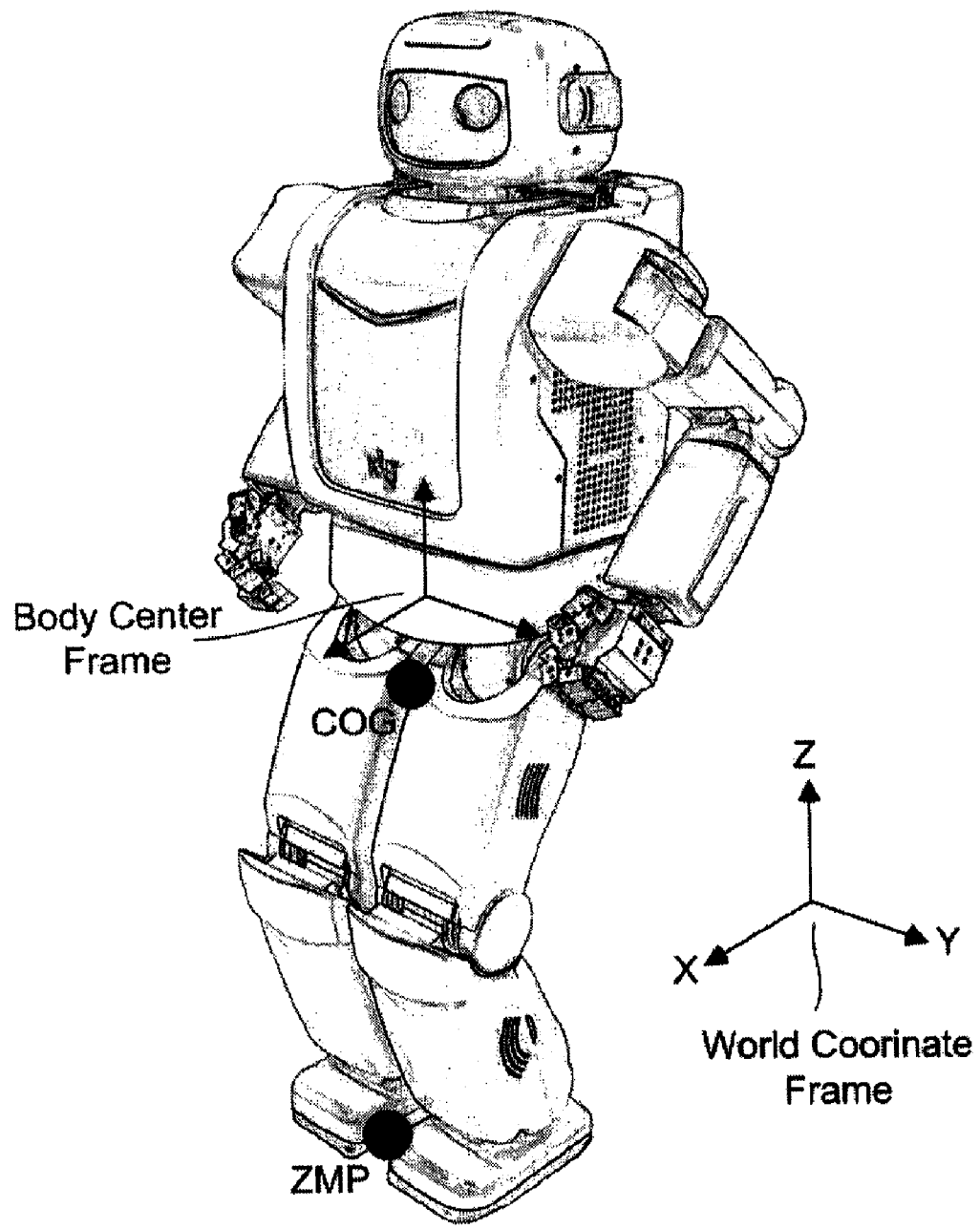
FIG. 1 is a conceptual picture of humanoid robot.

First, a simplified model of a humanoid bipedal walking robot is explained. The bipedal waking mechanism is an essential part of a humanoid robot as depicted in FIG. 1. Actually, to implement human-like walking, two legs should have high degrees of freedom not less than 12. So, it is difficult to use all of their dynamics to design their controller and to analyze their stability.

As an alternative, a method of calculating COG, simplifying the walking related dynamics of bipedal robot as the equation of motion for a point mass at COG.

Figure 2:
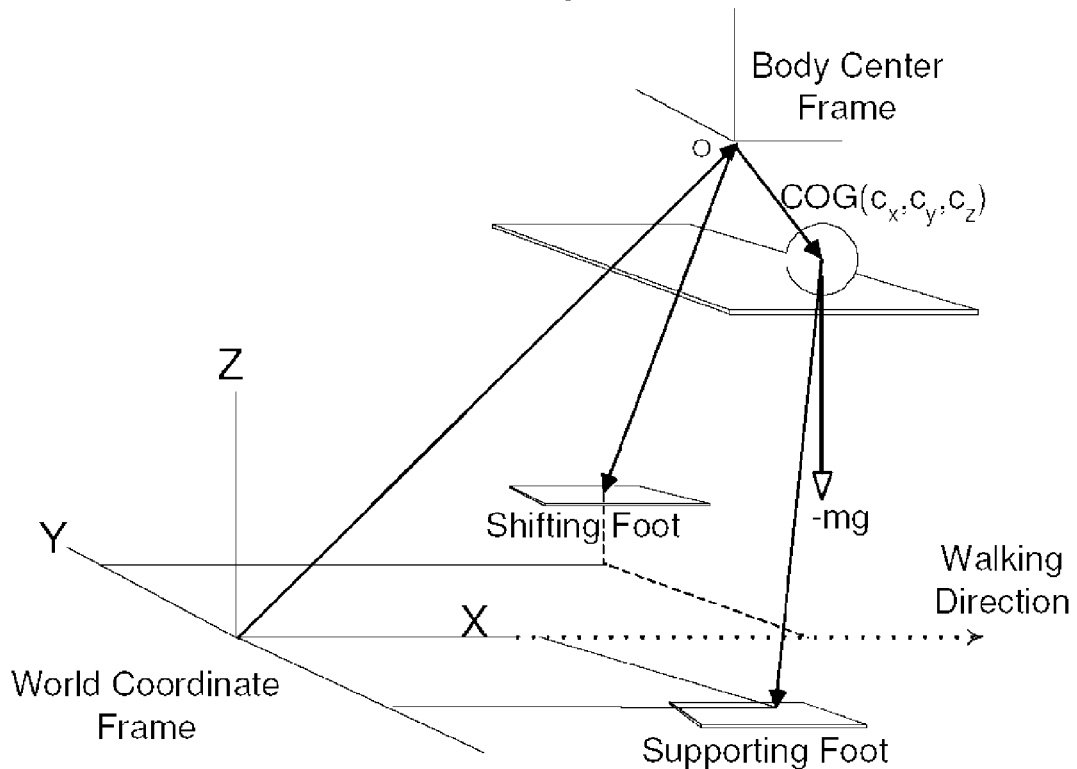
FIG. 2 is a rolling sphere model for dynamic walking humanoid robot.

As depicted in FIG. 2, assuming that the motion of COG is constrained on the plane ($z=c_z$), the rolling sphere model on the plane with the concentrated point mass (m) can be obtained as the simplified model for bipedal robot. In FIG. 2, the motion of the rolling sphere on a massless plane is described by the position of COG and the ZMP on the ground. The equations of motion of the rolling sphere in FIG. 2 are expressed on the plane $z=c_z$ by:

$$\tau_x = mgc_y - m\ddot{c}_y c_z$$

$$\tau_y = -mgc_x + m\ddot{c}_x c_z$$

$$\tau_z = -m\ddot{c}_x c_y + m\ddot{c}_y c_x \qquad \text{[Eq. 1]}$$

where, g is the acceleration of gravity,
$c_z$ is a height constant of the restricted plane, and
$\tau_i$ the moment for i-th coordinate axis.
If we introduce the definition of ZMP as [Equation 2] and applying it to [Equation 1], then two ZMP equations as [Equation 3] can be obtained as COG differential equation.

$$p_x \triangleq -\frac{\tau_y}{mg} \qquad \text{[Eq. 2]}$$

$$p_y \triangleq \frac{\tau_x}{mg}$$

$$p_x = c_x - \frac{c_z}{g}\ddot{c}_x \qquad \text{[Eq. 3]}$$

$$p_y = c_y - \frac{c_z}{g}\ddot{c}_y$$

Strictly defining, Equation 3 is equivalent to the inverted pendulum model describing differential equation relationship between COG and ZMP, and which is used as a simplified humanoid biped walking model in the invention.

For convenience of explanation, $g/c_z$ which is commonly used, is defined and used as Equation 4.

$$\omega_n = \sqrt{g/c_z} \qquad \text{[Eq. 4]}$$

As explained above, Equation 3 is obtained as a simplified biped walking humanoid model, which will be used to generate the walk pattern and to prove the stability of the walking controller that will be explained below.

2. Generation of Walking (Desired ZMP/COG Trajectory) Pattern

Figure 3:
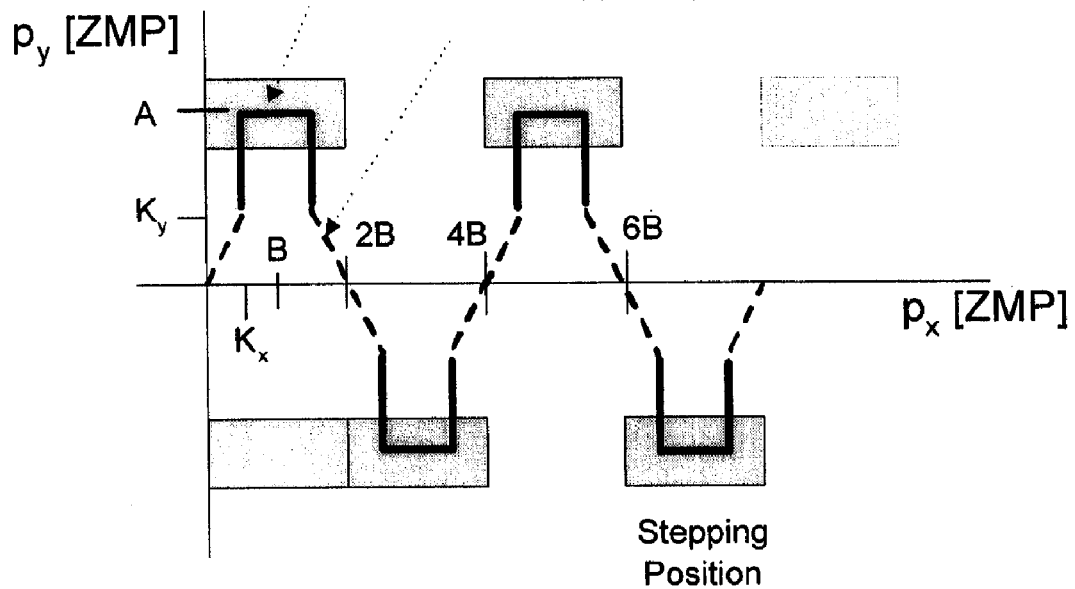
FIG. 3 depicts desired ZMP trajectory.

To implement robot walking, the stepping positions on the ground as in FIG. 3, and the supporting phases as the double/single supporting should be predetermined.

As shown in FIG. 3, the stepping positions are generally represented as periodic functions and the supporting phases are used in moving the ZMP. In a single supporting phase, the ZMP should stay in the sole of supporting leg while the shifting leg making a step. In a double supporting phase, the ZMP should be moved from the sole of the supporting leg to the sole of shifting leg. These procedures should be repeated to make stable robot walking.

The desired trajectory of COG should be derived from the desired ZMP in FIG. 3 by solving the Eq. 3 of differential equation. Hereinafter, procedures for generation of the desired trajectory of COG for X-axis and Y-axis will be described.

2.1 X Directional Walk Pattern Generation

The X-directional desired ZMP trajectory in FIG. 3 is expressed with a period time T as following Equation 5.

for $0 \le t < t_d$, $p_x(t)=(K_x/t_d)t=c_x(t)$ for $t_d \le t < T-t_d$, $p_x(t)=B$ for $T-t_d \le t < T$, $p_x(t)=(2B-K_x)+(K_x/t_d)(t-(T-t_d))=c_x(t)$ [Eq. 5]

where, B is the half of step length, $K_x$ means X-directional position of desired ZMP when the supporting phase is changed from double supporting phase to single supporting phase, $t_d$ means the time when $p_x(t_d)=K_x$ in the ZMP graph of broken line, namely, the change time from the double supporting phase to the single supporting phase in a period, $T-t_d$ means the change time from the single supporting phase to the double supporting phase.

In the double supporting phase, desired ZMP trajectory and desired COG trajectory are equivalent. Desired COG trajectory for generating desired ZMP trajectory in time domain in the single supporting phase can be obtained by solving the differential equation of Equation 3 in the condition of Equation 5 above. In other words, for $t_d \le t < T-t_d$, desired COG trajectory can be obtained by solving the differential equation of Equation 6.

$$\ddot{c}_x - \omega_n^2 c_x = -\omega_n^2 B \quad [\text{Eq. 6}]$$

General solution for above equation is as follows:

$$c_x(t)=C_{x1} \cos h(\omega_n(t-t_d))+C_{x2} \sin h(\omega_n(t-t_d))+B \quad [\text{Eq. 7}]$$

The unknown coefficient $C_{x1}$ and $C_{x2}$ of the general solution are determined like Equation 9 below by using the following boundary conditions of Equation 8.

$c_x(t_d)=K_x$ $\dot{c}_x(t_d)=K_x/t_d$ [Eq. 8]

$C_{x1} = K_x - B$ $C_{x2} = \dfrac{K_x}{t_d \omega_n}$ [Eq. 9]

Also, for satisfying another boundary conditions of $c_x(T-t_d)=2B-c_x(t_d)$ and $\dot{c}_x(T-t_d)=\dot{c}_x(t_d)$, unknown coefficient $K_x$ should satisfy the following relation:

$$K_x = \dfrac{Bt_d \omega_n}{t_d \omega_n + \tanh\left(\omega_n\left(\dfrac{T}{2} - t_d\right)\right)} \quad [\text{Eq. 10}]$$

Figure 4:
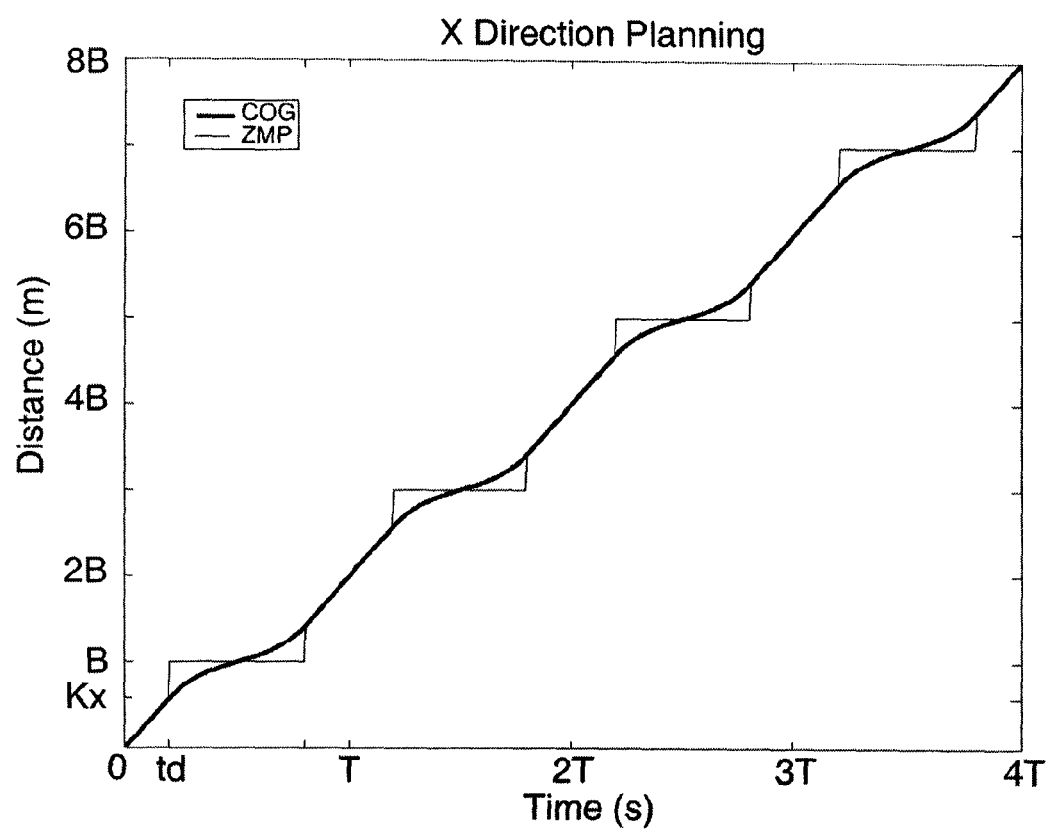
FIG. 4 depicts X-directional (forward direction) desired COG trajectory.

Therefore, if the walking period T, the change time $t_d$ from double supporting phase to single supporting phase in a period, and B, the half of a stride are determined, then $K_x$ is determined from Eq. (10), and then, the unknown coefficients $C_{x1}$ and $C_{x2}$ can be determined from Eq. (9). Then, the X-directional desired trajectory of COG can be obtained as the smooth function as depicted in FIG. 4.

2.2 Y-Directional Walking Pattern Generation

The Y-directional ZMP trajectory in FIG. 3 is also described as following Eq. (11) with period T:

for $0 \le t < t_d$, $p_y(t)=(K_y/t_d)t=c_y(t)$ for $t_d \le t < T-t_d$, $p_y(t)=A$ for $T-t_d \le t < T$, $p_y(t)=-(K_y/t_d)(t-T)=c_y(t)$ [Eq. 11]

where A is the half of the distance between the centers of two ankles, $K_y$ means Y-directional position of desired ZMP in change from double supporting phase to single supporting phase, $t_d$ means the time when $p_y(t_d)=K_y$ in the ZMP graph of broken line, namely, the change time from double supporting phase to single supporting phase in a period.

$T-t_d$ means the change time from the double supporting phase to the single supporting phase.

In the double supporting phase, desired ZMP trajectory and desired COG trajectory are equivalent. Desired COG trajectory for generating desired ZMP trajectory in time domain in the single supporting phase can be obtained by solving the differential equation of Eq. 3 with the condition of Eq. 11 above.

$$\ddot{c}_y - \omega_n^2 c_y = -\omega_n^2 A, \text{ for } t_d \le t < T-t_d \quad [\text{Eq. 12}]$$

General solution for the differential equation is as follow:

$$c_y(t)=C_{y1} \cos h(\omega_n(t-t_d))+C_{y2} \sin h(\omega_n(t-t_d))+A \quad [\text{Eq. 13}]$$

The unknown coefficient $C_{y1}$ and $C_{y2}$ of the general solution are determined as Equation 15 below by using the following boundary conditions of Equation 14.

$c_y(t_d)=K_y$ $\dot{c}_y(t_d)=K_y/t_d$ [Eq. 14]

$C_{y1} = K_y - A$ $C_{y2} = \dfrac{K_y}{t_d \omega_n}$ [Eq. 15]

Also, for satisfying another boundary conditions of $c_y(T-t_d)=c_y(t_d)$ and $\dot{c}_y(T-t_d)=-\dot{c}_y(t_d)$, unknown coefficient $K_y$ should satisfy the following relation:

$$K_y = \frac{At_d\omega_n\tanh\left(\omega_n\left(\frac{T}{2}-t_d\right)\right)}{1+t_d\omega_n\tanh\left(\omega_n\left(\frac{T}{2}-t_d\right)\right)} \quad [\text{Eq. 16}]$$

Therefore, if the walking period T, the change time $t_d$ from double supporting phase to single supporting phase in a period, and A, the half of the distance between the centers of two ankles are determined, then $K_y$ is determined from Eq. (16), and then, the unknown coefficients $C_{y1}$ and $C_{y2}$ can be determined from Eq. (15). Therefore, the Y-directional desired trajectory of COG can be obtained as the smooth function as depicted in FIG. 5.

Figure 5:
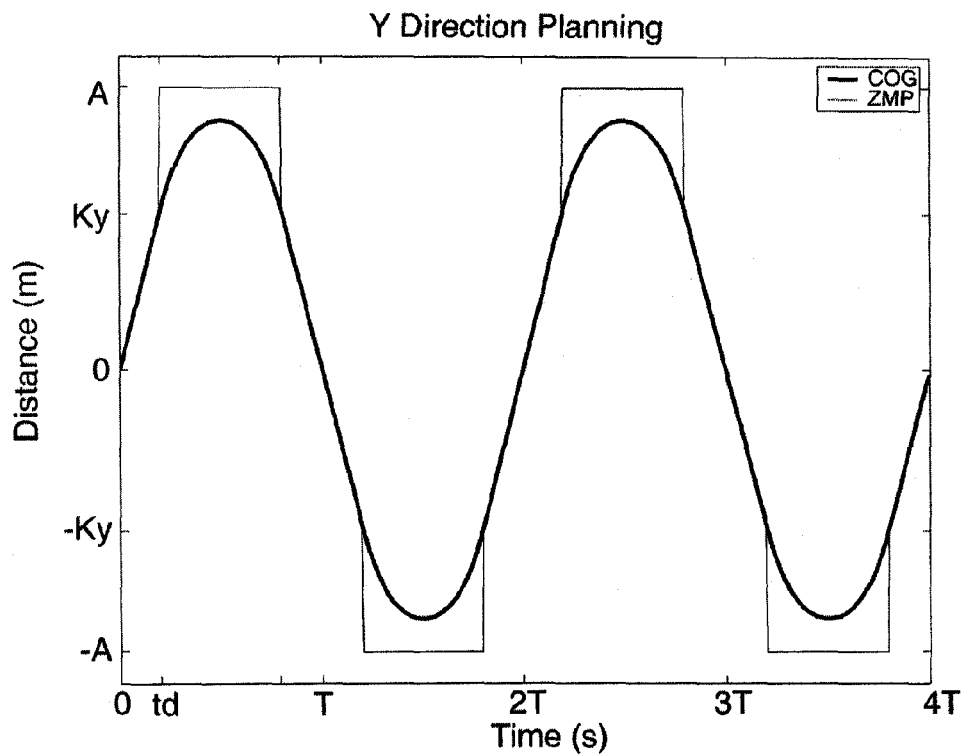
FIG. 5 depicts Y-directional (left-right direction) desired COG trajectory

To implement the desired COG motions of FIG. 4 and FIG. 5 in the real humanoid robot, the COG inverse kinematics should be resolved kinematically according to the driving motor axes from the desired COG (retangular coordinate) motion to the driving angular (joint) motion of driving motor axes attached to the leg of the robot. Hereafter the concrete kinematical analytic method using the COG Jacobian between the COG velocity and the angular velocity for the driving motor axes attached to supporting legs is explained.

3. Kinematical Resolution Method of COG Jacobian for Implementation of Walking Pattern At first, a partitioned COG Jacobian is introduced to embed a desired COG motion to a humanoid robot. Although a humanoid robot has 4 limbs of two arms and two legs, we assume that the robot has n limbs to derive a general equation.

The first limb is assigned to the base limb, and it should be one of the limbs on the ground to support the body. As depicted in FIG. 1, the body center coordinate frame is in the center of the robot, a kinematical equation reaching the i-th limb (one of both arms and legs) is written as follows:

$$^o\dot{x}_i = {}^oJ_i\dot{q}_i \quad [\text{Eq. 17}]$$

where, $^o\dot{x}_i$ means the velocity of the end point from the body center coordination frame, $\dot{q}_i$ means the joint velocity at the driving motor axis of the i-th limb, and $^oJ_i$ means the usual Jacobian matrix that can be obtained in the body center coordination frame.

The term "kinematical Jacobian" is, for example, explained in materials like [R. M. Murray, Z. Li, S. S. Sastry, "A Mathematical Introduction to Robotic Manipulation", Chapter 3].

The leading subscript $^o$ implies that the elements are represented on the body center coordinate system shown in FIG. 2, which is fixed on a humanoid robot.

For biped walking robot, the body center is floating, and thus the end point velocity of the i-th limb with respect to the world coordinate system shown in FIG. 2 is written as follows:

$$\dot{x}_i = X_i^{-1}\dot{x}_o + X_o{}^oJ_i\dot{q}_i \quad [\text{Eq. 18}]$$

where, $\dot{x}_o = [\dot{r}_o^T; \omega_o^T]$ is the velocity of the body center coordinate frame represented on the world coordinate system, and the transformation matrix of below Eq. 19 is a (6×6) matrix which relates the velocity of body center coordinate frame and the i-th limb velocity on the world coordinate system.

$$X_i = \begin{bmatrix} I_3 & [R_o^o r_i \times] \\ 0_3 & I_3 \end{bmatrix} \quad [\text{Eq. 19}]$$

for i=1, 2, . . . , n where, $I_3$ and $O_3$ are an (3×3) identity and zero matrix, respectively, $R_O$ means a (3×3) rotational matrix of body center coordinate system on the world coordinate system, $^or_i$ means the position vector from the body center to the end point of the i-th limb represented on the world coordinate system,

[(.)×] is a skew-symmetric matrix for the cross product.

The transformation matrix $X_0$ is defined as the following:

$$X_o = \begin{bmatrix} R_o & 0_3 \\ 0_3 & R_o \end{bmatrix} \quad [\text{Eq. 20}]$$

From the equation, the i-th limb Jacobian represented on the world coordinate system can be obtained from $J_i = X_0{}^oJ_i$.

All the limbs should satisfy the compatibility condition that the body center velocity is the same, and thus the i-th limb and the j-th limb should satisfy the following relation:

$$X_i(\dot{x}_i - J_i\dot{q}_i) = X_j(\dot{x}_j - J_j\dot{q}_j) \quad [\text{Eq. 21}]$$

From the Eq. 21, the joint velocity of any limb can be represented by the joint velocity of the base limb that supports the robot body on the ground.

Actually, the base limb should be chosen to be the supporting leg in the single supporting phase or any one of both legs in the double supporting phase. We express the base limb with the subscript 1, and then the joint velocity of any limb is expressed as:

$$\dot{q}_i = J_i^{-1}\dot{x}_i - J_i^{-1}X_{i1}(\dot{x}_1 - J_1\dot{q}_1), \quad [\text{Eq. 22}]$$

for i=1, 2, . . . , n where, the relative transformation matrix $X_{i1}$ that is newly introduced is defined as follows:

$$X_{i1} \triangleq X_i^{-1}X_1 = \begin{bmatrix} I_3 & [R_o(^or_1 - {}^or_i)\times] \\ 0_3 & I_3 \end{bmatrix} \quad [\text{Eq. 23}]$$

If a limb is a redundant system, any null motion optimization algorithm should be added in Eq. 22.

General COG Jacobian is introduced as follows:

$$\dot{c} = \dot{r}_o + \omega_o \times (c - r_o) + \sum_{i=1}^{n} R_o^o J_{ci}\dot{q}_i \quad [\text{Eq. 24}]$$

where n is the number of limbs, $\dot{c}$ is the velocity vector of COG represented in the world coordinate system, namely, $\dot{c} = [\dot{c}_x, \dot{c}_y, \dot{c}_z]^T$ and $^oJ_{ci}$ means COG Jacobian of i-th limb represented on the body center coordinate frame.

For the base limb (i=1), Eq. 18 is applied, Eq. 22 is applied for other limbs (i=2, . . . , n), and the COG motion of humanoid robot is determined only by the angular velocity $\dot{q}_1$ as in Eq. 25.

$$\dot{r}_1 + \omega_1 \times r_{c1} - R_o^o J_{v_1} \dot{q}_1 + r_{c1} \times \quad \text{[Eq. 25]}$$
$$R_o^o J_{\omega_1} \dot{q}_1 + R_o^o J_{c_1} \dot{q}_1 +$$
$$\dot{c} = \sum_{i=2}^{n} R_o^o J_{c_i} J_i^{-1} (\dot{x}_i - X_{i1} \dot{x}_1) +$$
$$\sum_{i=2}^{n} R_o^o J_{c_i} J_i^{-1} X_{i1} J_1 \dot{q}_1$$

Where, $r_{c1} = c - r_1$, $J_{v1} R_o^o J_{v1}$ and $J_{\omega 1} = R_o^o J_{\omega 1}$ are the linear and angular velocity part of the base limb Jacobian on the body center coordinate frame.

Finally, if the base limb is stuck to the ground, $\dot{r}_1 = \omega_1 = 0$ is satisfied in Eq. 25.

Eq. 25 can be rewritten as conventional kinematical Jacobian expressed as a base-limb motion.

$$\dot{c}_{emc} = J_{emc} \dot{q}_1 \quad \text{[Eq. 26]}$$

where, $C_{emc}$ and $J_{emc}$ are as follows:

$$\dot{c}_{emc} = \dot{c} - \sum_{i=2}^{n} R_o^o J_{c_i} J_i^{-1} (\dot{x}_i - X_{i1} \dot{x}_1), \quad \text{[Eq. 27]}$$
$$J_{emc} = R_o \begin{bmatrix} -{}^o J_{v_1} + r_{c1} \times \\ {}^o J_{\omega_1} + {}^o J_{c_1} \end{bmatrix} + \sum_{i=2}^{n} R_o^o J_{c_i} J_i^{-1} X_{i1} J_1.$$

The modified COG motion $\dot{c}_{emc}$ consists of two components: a desired COG motion (the first term) which is derived according to the derived walking pattern, and the relative effect of other limbs (except for the base limb) to the COG motion (the second term).

The modified COG Jacobian $J_{emc}$ also consists of 4 components: the effect of the body center (the first and the second term), the COG Jacobian of the first limb (the third term), and the effect of other limbs to the Jacobian (the last term).

The modified COG Jacobian $J_{emc}$ is a (3×$n_1$) matrix where $n_1$ is a dimension (the number of drving joint) of the base limb, which is smaller than that of the original COG Jacobian, thus the calculation time can be reduced. After solving Eq. 26 for other limb, the joint motion of the base limb is automatically obtained. The resulting base limb motion balances a humanoid robot automatically during the movement of the all other limbs. With the joint motion of the base limb, the joint motions of all other limbs are obtained by Eq. 22.

The resulting motion follows the given desired motion, regardless of the balancing motion of the base limb. That is, the humanoid robot can balance automatically with a given desired motion.

4. Walking and Posture Controller Design.

Joint drivers generating actual motion of a humanoid robot is an electromechanical system constituting of electric motors, gears, and link mechanism, which includes many internal disturbances such as backlash or electric ripple. Since a humanoid should drive in co-existing environment with humans, an unexpected contact with human or environment can be disturbances at any time. Such disturbances can be a hindrance for the robot driver to follow the desired COG and ZMP trajectory derived, in excessive situation, the humanoid robot can fall down with loss of stability.

Figure 6:
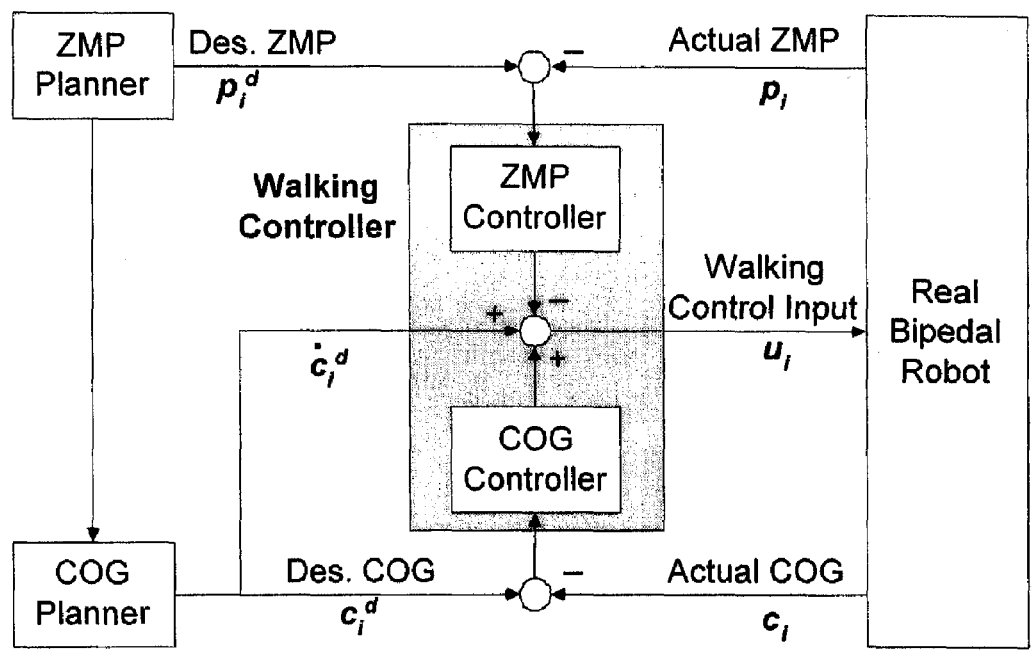
FIG. 6 is a walking controller for bipedal walking robot.

To prevent these phenomena and secure the walking stability of a robot, the walking controller disclosed in FIG. 6 is suggested in the invention.

The walking controller works as a controller when there is walking trajectory, which works as a posture controller for a robot body when the robot has stopped. So, the walking controller includes a posture controller.

In FIG. 6, first, the ZMP Planer and COG Planer generate the desired trajectories in FIGS. 4 and 5 which are satisfying the following differential equation:

$$p_i^d = c_i^d - 1/\omega_n^2 \ddot{c}_i^d \text{ for } i = x, y \quad \text{[Eq. 28]}$$

Second, the simplified model for the real bipedal walking robot has the following dynamics:

$$\dot{c}_i = u_i + \epsilon_i$$

$$p_i = c_i - 1/\omega_n^2 \ddot{c}_i \text{ for } i = x, y \quad \text{[Eq. 29]}$$

where $\epsilon_i$ is the disturbance produced by actual control error, $u_i$ is the walking control input, $c_i$ and $p_i$ are the actual COG and ZMP positions of the real bipedal robot, respectively.

In FIG. 6, the real bipedal robot makes the kinetic resolution from the walking control input to the motor driving joint velocity as explained above. Concretely speaking, the walking control input is applied to the term $\dot{c}_i$ with $u_i$.

Also, the real bipedal robot offers the ZMP information from force/torque sensors attached to the ankles of humanoid and the COG information from the encoder data attached to the motor driving axes by calculating COG position by resolving kinematical equation, respectively.

Hereafter, the design method of the walking (and posture) controller for the humanoid robot will be explained.

First, as depicted in FIG. 6, the ZMP error and COG error are defined as follows:

$$e_{p,i} \triangleq p_i^d - p_i$$

$$e_{c,i} \triangleq c_i^d - c_i, \text{ for } i = x, y \quad \text{[Eq. 30]}$$

The walking controller is replaced as $u_i$ by adding the ZMP controller and the COG controller in FIG. 6 to $\dot{c}$ which is the velocity component of the desired COG trajectory in Eq. 27.

$$u_i = \dot{c}_i^d - k_{p,i} e_{p,i} + k_{c,i} e_{c,i} \quad \text{[Eq. 31]}$$

where, the second term denotes the ZMP controller,
The third term denotes the COG controller.

The controllers are formed in proportional controller respectively. The COG controller has negative feedback, and the ZMP controller has positive feedback. As such, the controller according to Eq. 31 is different from conventional controllers. In the controller, $k_{p,i}$ and $k_{c,i}$ mean proportional gains of the ZMP controller and the COG controller, with the positive numbers satisfying the design condition in Eq. 32.

$$k_{c,i} > \omega_n \quad \text{[Eq. 32]}$$

and $$0 < k_{p,i} < \left( \frac{\omega_n^2 - \beta^2}{\omega_n} - \gamma^2 \right)$$

where $\beta$ and $\gamma$ are proportional gain design condition variables of the ZMP controller, satisfying Eq. 33 below:

$$\beta < \omega_n \quad \text{[Eq. 33]}$$

and $$\gamma < \sqrt{\frac{\omega_n^2 - \beta^2}{\omega_n}}$$

When the walking controller of Eq. 31 using the proportional gain satisfying Eq. 32 and 33 is applied to the humanoid bipedal robot, the total walking closed-loop control system has excellent bipedal walking performance and posture stability, which also has relative stability against the COG error and ZMP error for disturbances theoretically.

5. The Stability of the Walking and Posture Controller.

To show the robustness of the controller against disturbances, we explain according to general procedure to prove disturbance input-to-state stability (ISS).

Disturbance input-to-state stability (ISS) is defined when the dissipative inequality like Eq. 34 below is satisfied:

$$\dot{V} \leq -\gamma 1(|e|) + \gamma 2(|\epsilon|) \qquad [\text{Eq. 34}]$$

where $\dot{V}$ represents the total derivative for Lyapunov function, it represents negative definite for e, and negative definite for $\epsilon$.

Here, for theoretical proof, we assume that the disturbance produced by control error is bounded and its differentiation is also bounded, namely, $|\epsilon_i|<a$ and $|\dot{\epsilon}_i|<b$ with positive constants a and b.

As there is no way to prove stability for a system that have unbounded disturbance, generally, disturbances are assumed to be finite, which does not loss generality of stability proof explained below.

The first step to prove stability, we get the error dynamics for COG error from Eq. 28 and Eq. 29 as follows:

$$\ddot{e}_{c,i} = \omega_n^2 (e_{c,i} - e_{p,i}) \qquad [\text{Eq. 35}]$$

Second, another COG error dynamics is obtained by using Eq. 29 and Eq. 31:

$$k_{p,i} e_{p,e} = \dot{e}_{c,i} + k_{c,i} e_{c,i} + \epsilon_i \qquad [\text{Eq. 36}]$$

Also, the equation can be rearranged as follows:

$$\dot{e}_{c,i} = k_{p,i} e_{p,i} - k_{c,i} e_{c,i} - \epsilon_i \qquad [\text{Eq. 37}]$$

Third, by differentiating Eq. 36 and by using Eq. 35 and Eq. 37, the ZMP error dynamics is obtained as follows:

$$\dot{e}_{p,i} = 1/k_{p,i}(\ddot{e}_{c,i} + k_{c,i}\dot{e}_{c,i} + \dot{\epsilon}_i) \qquad [\text{Eq. 38}]$$

$$= \omega_n^2 / k_{p,i} (e_{c,i} - e_{p,i}) +$$

$$k_{c,i}/k_{p,i}(k_{p,i}e_{p,i} - k_{c,i}e_{c,i} - \epsilon_i) + (1/k_{p,i})\dot{\epsilon}_i$$

$$= \left(\frac{\omega_n^2 - k_{c,i}^2}{k_{p,i}}\right) e_{c,i} - \left(\frac{\omega_n^2 - k_{p,i} k_{c,i}}{k_{p,i}}\right) e_{p,i} +$$

$$\frac{1}{k_{p,i}}(\dot{\epsilon}_i - k_{c,i}\epsilon_i)$$

Fourth, to prove the stability, the following Lyapunov function is introduced.

$$V(e_{c,i}, e_{p,i}) \triangleq \frac{1}{2}[(k_{c,i}^2 - \omega_n^2)e_{c,i}^2 + k_{p,i}^2 e_{p,i}^2] \qquad [\text{Eq. 39}]$$

where $V(e_c, e_p)$ is the positive definite function for $k_{p,i}>0$ and $k_{c,i}>\omega_n$.

In above equation, differentiating the Lyapunov function and adjusting by using the COG error dynamics of Eq. 37 and the ZMP error dynamics of Eq. 38, the following equation can be obtained:

$$\dot{V} = (k_{c,i}^2 - \omega_n^2) e_{c,i} \dot{e}_{c,i} + k_{p,i}^2 e_{p,i} \dot{e}_{p,i} \qquad [\text{Eq. 40}]$$

$$= -k_{c,i}(k_{c,i}^2 - \omega_n^2)e_{c,i}^2 - k_{p,i}(\omega_n^2 - k_{p,i}k_{c,i})e_{p,i}^2 -$$

$$(k_{c,i}^2 - \omega_n^2)e_{c,i}\epsilon_i + k_{p,i}e_{p,i}\dot{\epsilon}_i - k_{p,i}k_{c,i}e_{p,i}\epsilon_i$$

$$= -k_{c,i}(k_{c,i}^2 - \omega_n^2)e_{c,i}^2 - k_{p,i}(\omega_n^2 - k_{p,i}k_{c,i})e_{p,i}^2 +$$

$$(k_{c,i}^2 - \omega_n^2)\left(\alpha^2 e_{c,i}^2 - \left|\alpha e_{c,i} + \frac{1}{2\alpha}\epsilon_i\right|^2 + \frac{1}{4\alpha^2}\epsilon_i^2\right) +$$

$$k_{p,i}\left(\beta^2 e_{p,i}^2 - \left|\beta e_{p,i} - \frac{1}{2\beta}\dot{\epsilon}_i\right|^2 + \frac{1}{4\beta^2}\dot{\epsilon}_i^2\right) +$$

$$k_{p,i} k_{c,i}\left(\gamma^2 e_{p,i}^2 - \left|\gamma e_{p,i} + \frac{1}{2\gamma}\epsilon_i\right|^2 + \frac{1}{4\gamma^2}\epsilon_i^2\right)$$

$$= -(k_{c,i} - \alpha^2)(k_{c,i}^2 - \omega_n^2)e_{c,i}^2 -$$

$$k_{p,i}[\omega_n^2 - (k_{p,i} + \gamma^2)k_{c,i} - \beta^2]e_{p,i}^2 -$$

$$(k_{c,i}^2 - \omega_n^2)\left|\alpha e_{c,i} + \frac{1}{2\alpha}\epsilon_i\right|^2 - k_{p,i}\left|\beta e_{p,i} - \frac{1}{2\beta}\dot{\epsilon}_i\right|^2 -$$

$$k_{p,i} k_{c,i}\left|\gamma e_{p,i} + \frac{1}{2\gamma}\epsilon_i\right|^2 +$$

$$\left[\frac{(k_{c,i}^2 - \omega_n^2)}{4\alpha^2} + \frac{k_{p,i} k_{c,i}}{4\gamma^2}\right]\epsilon_i^2 + \frac{k_{p,i}}{4\beta^2}\dot{\epsilon}_i^2$$

In the equation, by excluding terms using completion of square with negative finite, the following inequality can be obtained for the differentiation of Lyapunov function:

$$\dot{V} \leq -(k_{c,i} - \alpha^2)(k_{c,i}^2 - \omega_n^2)e_{c,i}^2 - \qquad [\text{Eq. 41}]$$

$$k_{p,i}[\omega_n^2 - (k_{p,i} + \gamma^2)k_{c,i} - \beta^2]e_{p,i}^2 +$$

$$\left[\frac{(k_{c,i}^2 - \omega_n^2)}{4\alpha^2} + \frac{k_{p,i} k_{c,i}}{4\gamma^2}\right]\epsilon_i^2 + \frac{k_{p,i}}{4\beta^2}\dot{\epsilon}_i^2$$

Where $e^2_{c,i}$ term is negative definite with the arbitrary positive number satisfying $\alpha<\sqrt{\omega_n}$ and $e^2_{c,i}$ term is always negative definite under the given condition Eq. 32. And, if the ZMP proportional gain satisfies Eq. 32, for arbitrary constants $\beta$ and $\gamma$ satisfying Eq. 33, the terms related to $e^2_{p,i}$ are always negative definite. The last two terms in the above equation, that is, the square of disturbances ($\epsilon_i^2$) and the square of its derivative ($\dot{\epsilon}_i^2$) are always positive definite.

As suggested in Eq. 34, the walking controller has a disturbance input-to-state stability because it represents negative definite for error state variable and positive definite for disturbance, thus restricting the differential of Lyapunov function.

The thing that the ZMP controller, which is one part of the walking controller in Eq. 31, has positive feedback is fairly different from conventional controllers with negative feedback. For practical use, the gain conditions of walking controller can be simply rewritten without arbitrary positive number $\alpha$, $\beta$, $\gamma$ as follows:

$$k_{c,i}>\omega_n \text{ and } 0<k_{p,i}<\omega_n \qquad [\text{Eq. 42}]$$

Simplicity is possible because the stability proof is very conservative. Also, the proportional gain design condition in Eq. 42 is much easier to use.

An Application Example of the Walking and Posture Controller.

In order to demonstrate the effectiveness of walking controller proposed in the invention, an application experiment for the biped walking robot was performed.

First, the desired ZMP/COG trajectories are obtained by setting the duration of walking T=1.0 [s], the change time from double support phase to single support phase $t_d$=0.1 [s], the half of both ankles A=0.09 [m], the half of walking stride B=0.1 [m], weight of the robot m=67.68 [kg], the height constant of COG $c_z$=0.7502 [m] and $\omega_n=\sqrt{g/c_z}$=3.613.

Second, the gains of walking controller are set as the ZMP proportional gain $k_{p,i}$={3.6, 1.8} and the COG proportional gain $k_{c,i}$={6.6, 3.8}.

Excellent results have come by applying for a network-based humanoid robot (Mahru), which was developed by the inventors, using parameters above.

INDUSTRIAL APPLICABILITY

In this invention, the walking pattern generation method of a humanoid robot, a kinematical resolution to robot driving axes of walking motion, which uses the COG Jabobian, and a walking controller design method with stability are suggested. The developed humanoid walking controller is constituted of the difference between the COG controller and the ZMP controller, which has disturbance Input-to-State Stability (ISS) against disturbances, compared to a simplified walking robot model.

The invention claimed is:

1. A method for controlling walking of a humanoid bipedal walking robot comprising limbs, the method comprising steps of:
   (a) designing a desired trajectory of zero momentum position (desired ZMP trajectory) of the robot against the ground surface;
   (b) calculating a desired trajectory of a center of gravity (desired COG trajectory) of the robot from the desired ZMP trajectory;
   (c) calculating a desired COG motion using the desired COG trajectory;
   (d) obtaining usual kinematical Jacobians which represent relations of angular velocities of driving motors of each limb of the robot to velocities of each limb of the robot represented in a world coordinate system and a body center coordinate system;
   (e) selecting a base limb to be a supporting leg in the single supporting phase or any one of both of the legs in the double supporting phase;
   (f) obtaining a modified COG motion using the desired COG motion based on desired motions of each limb except for the base limb, the usual kinematical Jacobians, and a modified COG Jacobian which represents the relationship between a modified COG velocity and the base limb;
   (g) obtaining an angular velocity of a driving motor for the base limb using the modified COG motion and the modified COG Jacobian;
   (h) obtaining angular velocities of driving motors for other limbs except for the base limb using the angular velocity of a driving motor for the base limb; and
   (i) controlling walking of the robot by driving the driving motors for the limbs of the robot according to the angular velocity of the driving motor for the base limb and according to the angular velocity of the driving motors for the other limbs.

2. The method of claim 1, wherein the desired ZMP trajectory for the walking direction (X-axis direction) $p_x(t)$ of the robot in step (a) is designed as the following Eq. 5:

for $0 \leq t < t_d$, $p_x(t)=(K_x/t_d)t=c_x(t)$ for $t_d \leq t < T-t_d$, $p_x(t)=B$ for $T-t_d \leq t < T$, $p_x(t)=(2B-K_x)+(K_x/t_d)(t-(T-t_d))=c_x(t)$  [Eq. 5]

wherein,
T is a single period of walking,
$t_d$ means the change time from a double supporting phase to a single supporting phase in a period,
B is the half of a stride, and
$K_x$ is displacement of the zero momentum position (ZMP) during the $t_d$, which is determined from Eq. (10):

$$K_x = \frac{B t_d \omega_n}{t_d \omega_n + \tanh\left(\omega_n\left(\frac{T}{2} - t_d\right)\right)}. \quad [\text{Equation 10}]$$

3. The method of claim 2, wherein the desired ZMP trajectory $p_y(t)$ for the left-right direction (the Y-axis direction) with respect to the walking proceeding direction (the X-Axis direction) in step (a) is designed as Eq. 11:

for $0 \leq t < t_d$, $p_y(t)=(K_y/t_d)t=c_y(t)$ for $t_d \leq t < T-t_d$, $p_y(t)=A$ for $T-t_d \leq t < T$, $p_y(t)=-(K_y/t_d)(t-T)=c_y(t)$  [Eq. 11]

wherein,
A is half of the distance between the centers of two ankles, and
$K_y$ is the displacement of the ZMP during $t_d$, which is defined as Eq. (16):

$$K_y = \frac{A t_d \omega_n \tanh\left(\omega_n\left(\frac{T}{2} - t_d\right)\right)}{1 + t_d \omega_n \tanh\left(\omega_n\left(\frac{T}{2} - t_d\right)\right)}. \quad [\text{Eq. 16}]$$

4. The method of claim 2, wherein the desired COG trajectory for the X-axis direction $c_x(t)$ in the step (b)
   is equivalent to the desired ZMP trajectory $p_x(t)$ in the double supporting phase, and
   is equivalent to the following Eq. 7 in the single supporting phase:

$c_x(t)=C_{x1} \cos h(\omega_n(t-t_d))+C_{x2} \sin h(\omega_n(t-t_d))+B$  [Eq. 7]

wherein, the coefficient $C_{x1}$ and $C_{x2}$ are as the following Eq. 9:

$$C_{x1} = K_x - B \quad [\text{Equation 9}]$$
$$C_{x2} = \frac{K_x}{t_d \omega_n}.$$

5. The method of claim 3, wherein the desired COG trajectory for the Y-axis direction $c_y(t)$ is equivalent to the desired ZMP trajectory $p_y(t)$ in the double supporting phase, and is equivalent to the following Eq. 13 in the single supporting phase:

$c_y(t)=C_{y1} \cos h(\omega_n(t-t_d))+C_{y2} \sin h(\omega_n(t-t_d))+A$  [Eq. 13]

wherein the coefficients $C_{y1}$ and $C_{y2}$ are as the following Eq. 15:

$$C_{y1} = K_y - A$$ [Eq. 15]

$$C_{y2} = \frac{K_y}{t_d \omega_n}.$$

6. The method of claim 5, wherein the angular velocity of the driving motor for the base limb in the step (g) is obtained by solving the dynamic equation of the following Eq. 25 for all the other limbs except the base limb:

$$\dot{c} = \dot{r}_1 + \omega_1 \times r_{c1} - R_o^o J_{v_1} \dot{q}_1 + r_{c1} \times R_o^o J_{\omega_1} \dot{q}_1 + R_o^o J_{c_1} \dot{q}_1 +$$
$$\sum_{i=2}^{n} R_o^o J_{c_i} J_i^{-1}(\dot{x}_i - X_{i1}\dot{x}_1) + \sum_{i=2}^{n} R_o^o J_{c_i} J_i^{-1} X_{i1} J_1 \dot{q}_1$$ [Eq. 25]

wherein, $\dot{c}$ is the velocity vector of the COG represented in the world coordinate system, $r_{c1} = c - r_1$ is a position vector from the end of the base limb to the center of gravity (COG), $\dot{q}_1$ is angular velocity of the driving motor attached to the base limb, $^oJci$ is CoM Jacobian matrix of the i-th limb represented on the body center coordinate frame, and $J_{v1} = R_o{}^oJ_{v1}$ and $J_{\omega 1} = R_o{}^oJ_{\omega 1}$ are the partial matrix of the linear and angular velocity of the base limb Jacobian, respectively.

7. The method of claim 6, wherein the angular velocities of the other limbs in the step (h) can be obtained from the following Eq. 22 by using the angular velocity of the driving motor of the base limb:

$$\dot{q}_i = J_i^{-1} \dot{x}_i - J_i^{-1} X_{i1}(\dot{x}_1 - J_1 \dot{q}_1),$$ [Eq. 22]

for i=1, 2, ..., n wherein the relative transformation matrix $X_{i1}$ is defined as follows:

$$X_{i1} \triangleq X_i^{-1} X_1 = \begin{bmatrix} I_3 & [R_o({}^or_1 - {}^or_i) \times] \\ 0_3 & I_3 \end{bmatrix}.$$ [Eq. 23]

8. The method of claim 6, wherein $u_i$ in Eq. 31 wherein ZMP error and COG error are reflected is used as the COG velocity vector of the following Eq. 25:

$$u_i = \dot{c}_i^d - k_{p,i} e_{p,i} + k_{c,i} e_{c,i}$$ [Eq. 31]

wherein $e_{p,i}$ and $e_{c,i}$ are the ZMP error and the COG error respectively as defined in Eq. 30, and $k_{p,i}$ and $k_{c,i}$ are proportional control gains:

$$e_{p,i} \triangleq p_i^d - p_i$$
$$e_{c,i} \triangleq c_i^d - c_i, \text{ for } i=x,y.$$ [Eq. 30]

9. The method of claim 8, wherein the control gain $k_p$, and satisfy the design condition of Eq. 32:

$$k_{c,i} > \omega_n \text{ and } 0 < k_{p,i} < \left( \frac{\omega_n^2 - \beta^2}{\omega_n} - \gamma^2 \right)$$ [Eq. 32]

wherein $\beta$ and $\gamma$ satisfy the following Eq. 33:

$$\beta < \omega_n \text{ and } \gamma < \sqrt{\frac{\omega_n^2 - \beta^2}{\omega_n}}.$$ [Eq. 33]

* * * * *